(12) United States Patent
DiMascio

(10) Patent No.: US 8,551,904 B2
(45) Date of Patent: Oct. 8, 2013

(54) HIGH SURFACE AREA CERAMIC CATALYSTS AND THE MANUFACTURE THEREOF

(75) Inventor: Felice DiMascio, Rocky Hill, CT (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 13/049,412

(22) Filed: Mar. 16, 2011

(65) Prior Publication Data

US 2011/0212829 A1 Sep. 1, 2011

Related U.S. Application Data

(63) Continuation of application No. 11/502,833, filed on Aug. 11, 2006, now abandoned.

(60) Provisional application No. 60/707,415, filed on Aug. 11, 2005.

(51) Int. Cl.
*B01J 27/224* (2006.01)
*B01J 23/00* (2006.01)
*C03C 3/068* (2006.01)

(52) U.S. Cl.
USPC .................... 502/178; 502/325; 501/78

(58) Field of Classification Search
USPC .................... 502/178, 325; 501/78
See application file for complete search history.

(56) References Cited

U.S. PATENT DOCUMENTS

| 3,690,622 | A | | 9/1972 | Brunner et al. | |
| 3,845,181 | A | * | 10/1974 | Ravault | 264/628 |
| 4,362,707 | A | * | 12/1982 | Hardee et al. | 423/478 |
| 4,472,332 | A | * | 9/1984 | Fukushima et al. | 264/44 |
| 4,632,876 | A | * | 12/1986 | Laird et al. | 428/404 |
| 4,657,880 | A | * | 4/1987 | Lachman et al. | 502/64 |
| 4,725,390 | A | * | 2/1988 | Laird et al. | 264/660 |
| 4,806,206 | A | * | 2/1989 | Kamijo et al. | 162/145 |
| 4,888,317 | A | * | 12/1989 | DeAngelis et al. | 502/60 |
| 5,039,644 | A | * | 8/1991 | Lachman et al. | 502/208 |
| 5,814,262 | A | * | 9/1998 | Ketcham et al. | 264/316 |
| 6,582,819 | B2 | * | 6/2003 | McDaniel et al. | 428/402 |
| 6,869,517 | B2 | * | 3/2005 | DiMascio | 205/499 |
| 6,913,741 | B2 | * | 7/2005 | DiMascio | 423/477 |
| 7,179,363 | B2 | * | 2/2007 | DiMascio et al. | 205/556 |
| 7,241,435 | B2 | * | 7/2007 | DiMascio | 423/477 |
| 2003/0082095 | A1 | * | 5/2003 | DiMascio | 423/477 |
| 2005/0146066 | A1 | * | 7/2005 | Koide et al. | 264/44 |

* cited by examiner

*Primary Examiner* — Patricia L Hailey
(74) *Attorney, Agent, or Firm* — Edward O. Yonter; Andrew D. Sorensen

(57) ABSTRACT

A process for making a ceramic catalyst material includes mixing a catalyst precursor material with a mineral particulate to form a mixture; adding a binder, silicon carbide, and a parting agent to the mixture to form unfired spheroids; and heating the unfired spheroids at a temperature effective to oxidize the silicon carbide and the catalyst precursor material to form the ceramic catalyst material. In another embodiment, the process includes the addition of a catalyst metal oxide salt to an aluminosilicate hydrogel aggregate mixture. Once the mixture sets, the set mixture is heated to a temperature to effective to produce a high surface area ceramic catalyst material.

16 Claims, No Drawings

HIGH SURFACE AREA CERAMIC CATALYSTS AND THE MANUFACTURE THEREOF

CROSS REFERENCE TO RELATED APPLICATIONS

This application is a continuation and claims the benefit of U.S. patent application Ser. No. 11/502,833, filed on Aug. 11, 2006 now abandoned, and entitled "High Surface Area Ceramic Catalysts and the Manufacture Thereof," now abandoned, which in turn claimed the benefit of U.S. Provisional Patent Application No. 60/707,415, filed on Aug. 11, 2005, and entitled "High Surface Area Ceramic Catalysts and the Manufacture Thereof." Each of these applications is incorporated herein in their entirety by reference.

BACKGROUND OF THE INVENTION

The present disclosure generally relates to ceramic catalysts and in particular, to high surface area ceramic catalysts.

With the decline of gaseous chlorine as a microbiocide, various alternatives have been explored, including bleach, bleach with bromide, bromochlorodimethyl hydantoin, ozone, and chlorine dioxide ($ClO_2$). Of these, chlorine dioxide has generated a great deal of interest for control of microbiological growth in a number of different industries, including the dairy industry, the beverage industry, the pulp and paper industries, the fruit and vegetable processing industries, various canning plants, the poultry industry, the beef processing industry, and miscellaneous other food processing applications. Chlorine dioxide is also seeing increased use in municipal potable water treatment facilities and in industrial waste treatment facilities, because of its selectivity towards specific environmentally-objectionable waste materials, including phenols, sulfides, cyanides, thiosulfates, and mercaptans. In addition, chlorine dioxide is being used in the oil and gas industry for downhole applications as a well stimulation enhancement additive.

Unlike chlorine, chlorine dioxide remains a gas when dissolved in aqueous solutions and does not ionize to form weak acids. This property is at least partly responsible for the biocidal effectiveness of chlorine dioxide over a wide pH range, and makes it a logical choice for systems that operate at alkaline pH or that have poor pH control. Moreover, chlorine dioxide is a highly effective microbiocide at concentrations as low as 0.1 parts per million (ppm) over a wide pH range.

The biocidal activity of chlorine dioxide is believed to be due to its ability to penetrate bacterial cell walls and react with essential amino acids within the cell cytoplasm to disrupt cell metabolism. This mechanism is more efficient than other oxidizers that "burn" on contact and is highly effective against legionella pneumophilia, algae and amoebal cysts, giardia cysts, coliforms, salmonella, shigella, various viruses, and cryptosporidium.

Unfortunately, chlorine dioxide in solution is unstable with an extremely short shelf life and thus, is not commercially available. Chlorine dioxide must typically be generated at its point of use such as, for example, by a reaction between an aqueous solution of a metal chlorate salt or metal chlorite salt and a strong acid. To increase the yield, it oftentimes is desirable to employ a catalyst.

Catalysts, which may generally take the form of heterogeneous, homogeneous, or biological catalysts are of significant importance to the chemical industry as evidenced by the fact that the great majority of all chemicals produced have been in contact with a catalyst at some point during their production.

Despite the many advances in the areas of homogeneous and biological catalysis, heterogeneous catalysts remain the predominant form used by industry. Heterogeneous catalysts are favored in part because they tolerate a much wider range of reaction temperatures and pressures, they can be more easily and inexpensively separated from a reaction mixture by filtration or centrifugation, they can be regenerated, and they are less toxic than their homogeneous or biological counterparts.

Heterogeneous catalysts utilized in chlorine dioxide generation processes are generally a granular solid material that operates on reactions taking place in the gaseous or liquid state, and generally includes a reactive species and a support for the reactive species. Deposition of the reactive species (i.e., the catalyst) onto the support generally includes numerous processing steps. Typically, the support is obtained separately upon which the catalyst is deposited and activated. For example, commercially available ceramic particles are first obtained and backwashed with water to remove fines. The backwashed ceramic particles are then baked at an elevated temperature (e.g., 50°) to remove residual water. Preparation of the catalyst material then includes contacting the support with a catalyst precursor to form active metal catalyst sites, for example, a catalyst precursor salt. For example, a metal oxide precursor salt is dissolved in an aqueous solution including an alcohol, and the solution is then coated onto the support. Depending on the desired properties, a solution of the metal oxide precursor salt may contain further additives, for example, ions that increase the solubility of the metal oxide precursor. Alternatively, the metal catalyst may be deposited onto the support material using other techniques such as impregnation, coprecipitation, ion exchange, dipping, spray coating, vacuum deposition, sputtering or the like. In addition, it is generally known that the catalyst activity of the catalyst material is improved with multiple depositions (i.e., the metal oxide precursor solution is applied by several individual depositions).

The metal deposited onto the support by the precursor solution is then thermally or chemically oxidized to the oxide form. For example, the catalyst material can be calcined in excess of 500° C. in an oven, which allows the precious metal salt to convert to its active oxide form. The catalyst material is then cooled and in order to increase the number of active site, some of the above noted steps may be repeated. In summary, the prior art processes for preparing catalyst material suitable for use in chlorine dioxide processing involved numerous steps, requiring a significant amount of time.

Accordingly, there remains a need for improved methods of making the catalyst material.

BRIEF SUMMARY OF THE INVENTION

In one embodiment, a process for making a ceramic catalyst material comprises mixing a catalyst precursor material with a mineral particulate to form a mixture; adding a binder, silicon carbide, and a parting agent to the mixture to form unfired spheroids; and heating the unfired spheroids at a temperature effective to oxidize the silicon carbide and the catalyst precursor material to form the ceramic catalyst material.

In another embodiment, the process for forming a porous ceramic catalyst material comprises mixing a binder, aggregates, and a catalyst precursor, wherein the binder comprises an alkali, alumina, and silica; forming a rigid composite of the mixture; and heating the rigid composite to a temperature greater than 500° C. to form the porous ceramic catalyst material.

The above-described embodiments and other features will become better understood from the detailed description.

DETAILED DESCRIPTION OF THE PREFERRED EMBODIMENTS

Disclosed herein are processes for preparing a ceramic catalyst material suitable for use in processes for catalytically forming, in situ, aqueous chlorine dioxide. The process for preparing the ceramic catalyst material generally includes forming a mineral slurry, mixing a catalytically active metal salt or metal oxide into the slurry, and subjecting the mixture to heat to form the ceramic catalyst material. The disclosed process for forming the ceramic catalyst material advantageously minimizes the numerous steps known in the art for manufacturing ceramic catalyst materials. Moreover, the so formed ceramic catalyst material advantageously reduces desorption of reactive species from the ceramic support and effectively eliminates release of catalyst fines. Further, any bypassing or fluidizing of the ceramic catalyst material by a reactive mixture is effectively eliminated and any pressure drop that may occur through compaction is also eliminated and/or significantly reduced.

The term "catalyst particles and/or sites" has its ordinary meaning as used herein, and generically describes a material which increases the rate of a chemical reaction but which is not consumed by the reaction. Further, the catalyst particles and/or sites affect only the rate of the reaction; it changes neither the thermodynamics of the reaction nor the equilibrium composition. Further, as used herein to describe the catalyst material or components of the catalyst material, the term "catalyst" is intended to refer to heterogeneous catalysts, as opposed to homogeneous or biological catalysts.

The term "reactive species" is used herein for convenience to refer generically to an active component of the catalyst material during a chemical reaction process.

The term "promoter" has its ordinary meaning as used herein and generally describes a material that is not catalytically active by itself but, when in the presence of the reactive species, enhances the performance of the reactive species.

The term "support" has its ordinary meaning as used herein and generally describes an inactive component of the catalyst during the chemical reaction process.

The terms "reaction mixture" or "reactant mixture" are used herein for convenience to refer generically to any reactants of a reaction that are brought into contact with the catalyst particles and/or sites.

The term "ceramic" is given its ordinary meaning and generally refers to a high-temperature material used in forming substrates. This material can be inorganic, nonmetallic, and crystalline. Exemplary ceramic materials based on clays include bentonite, smectite, montmorillonite, paligorskite, attapulgite, sepiolite, saponite, kaolinite, halloysite, hectorite, beidellite, stevensite, fire clay, ground shale, and the like. Examples of other classes of ceramics include earthy or inorganic materials such as silicon nitride, boron carbide, silicon carbide, magnesium diboride, ferrite, steatite, yttrium barium copper oxide, anthracite, glauconite, faujasite, mordenite, clinoptilolite, and the like. Carbon based ceramics include for example carbon black, activated carbon, carbon fibrils, carbon hybrids, and the like. Suitable oxides that are sometimes referred to as ceramics include for example oxides of titanium, aluminum, niobium, silicon, zinc, zirconium, cerium, and the like. Examples of suitable mixed oxides include aluminatitania, alumina-zirconia, ceria-zirconia, ceria-alumina, silica-alumina, silica-titania, silica-zirconia, and the like. Suitable zeolites that can be referred to as ceramic include any of the more than about 40 known members of the zeolite group of minerals and their synthetic variants, including for example Zeolites A, X, Y, USY, ZSM-5, and the like, in varying Si to Al ratios. Suitable carbonates include for example carbonates of calcium, barium, strontium, and the like. Other ceramic materials will be apparent to those skilled in the art in view of this disclosure.

In one embodiment, the process for making the ceramic catalyst material generally includes mixing mineral particulates, a binder, silicon carbide, a catalyst precursor, and a parting agent are mixed and spheroidized in order to form unfired spheroids. One example of mineral particulates contains: 60% orthoclase (potassium aluminum silicate); 10% nepheline (sodium potassium aluminum silicate); 10% hornblende (calcium magnesium iron aluminum silicate hydroxide); 5% diopside (calcium magnesium silicate); 15% accessory minerals (titanite, apatite, magnetite, and biotite); and trace amounts of secondary minerals (e.g. kaolinite and analcite). Another example contains approximately 75% plagioclase (sodium potassium aluminum silicate); and orthoclase feldspar (potassium aluminum silicate); and 25% of the minerals pyroxene, hornblende, magnetite, and quartz of which magnetite is less than 5%. Byproduct mineral fines of perlite (containing 2-5% chemically bound water) will also function as the mineral particulates. Minerals containing chemically bound water or sulfur, which are useful components of the mineral particulates, are hornblende, apatite, biotite, pyrite, vermiculite, and perlite.

Binders that may be useful as raw materials include bentonite starch, polyvinyl alcohol, cellulose gum, polyvinyl acetate, and sodium lignosulphonate. The amount of binder may generally comprise about 1 to about 5% by weight of the dry materials fed to the mixer and is generally sufficient to permit screening and handling of the spheroids without significant attrition or breakage.

Suitable parting agents include magnesium oxide, zircon, diaspora, and high alumina clays as well as other surface metal oxides.

Suitable catalyst precursors include a metal oxide precursor salt that is dissolved in an aqueous solution including an alcohol, and the solution is added to the mineral slurry, preferably with agitation. Suitable alcohols include methanol, ethanol, isopropanol, propanol, butanol, combinations including at least one of the foregoing alcohols, and the like. In a preferred embodiment, the metal oxide precursor salt is dissolved in isopropanol and deionized water solution. The amount of alcohol used in the solution is dependent on the solubility of the metal oxide precursor salt, wherein the volume fraction of alcohol in an aqueous solution is about 30 to about 90% (v/v), with about 40 to about 80% (v/v) preferred, and with about 50 to about 60% (v/v) more preferred.

Depending on the desired properties, a solution of the metal oxide precursor salt may contain further additives, for example, ions that increase the solubility of the metal oxide precursor. Suitable ions include hydroxides, chlorides, phosphates, sulfates, ammonium, potassium, sodium, lithium or the like. Preferably, the additive is ammonium hydroxide. The weight fraction of additive in the solution is about 0.1 to about 10% (w/v), with about 0.5 to about 5% (w/v) preferred and with about 1% (w/v) more preferred.

In one embodiment, the active metal catalyst is a noble metal and does not react or dissolve with any of the components or solutions used. While not wanting to be bound by theory, it is believed that the catalytic activity of the active metal is associated with crystal imperfections and the finely divided deposits help to increase the surface area as well as increase the number of active catalytic sites. Suitable active metal catalysts include, but are not limited to, ruthenium, platinum, palladium, osmium, iridium, rhodium, titanium, manganese, lead, zirconium, niobium, tantalum, tungsten, tin, and composites or mixtures or alloys or oxides of at least one of the foregoing metal catalysts. Preferably, the active metal catalyst is an oxide of a metal selected from the group consisting of ruthenium, platinum, palladium, osmium, iridium, and rhodium. More preferably, the active metal catalyst is a platinum oxide.

In another embodiment, the active metal catalyst is a combination of an oxide of ruthenium, platinum, palladium, osmium, iridium, rhodium, or mixtures or alloys of at least one of the foregoing and a less active oxide of a metal including titanium, lead, manganese, zirconium, niobium, tantalum, tungsten, tin, or mixtures or alloys of at least one of the foregoing. Preferably, the molar ratio of the active metal catalyst to the less active metal catalyst is about 0.3:1 to about 100:1. More preferably, the molar ratio of the active metal catalyst to the less active metal catalyst is about 10:1.

In another embodiment, the reactive species comprises a metal or metal oxide, comprising an element of Groups 3-10 and 14 of the Periodic Table of Elements. Preferably, the reactive species comprises a precious metal or precious metal oxide. Precious metals comprise the elements of Groups 8, 9, and 10 of the Periodic Table of Elements. In one exemplary embodiment, the reactive species is a platinum oxide.

In yet another embodiment, when the reactive species comprises a metal oxide, the metal of the metal oxide is desirably in its highest possible oxidation state. In another embodiment, for metals with multiple oxidation states, the metal of the metal oxide may be partially oxidized. For example, with platinum oxides platinum may be in the 2+ and/or in the 4+ oxidation state.

Preparation of the catalyst ceramic material generally includes contacting the mixture with the catalyst precursor to form the active metal catalyst sites, for example, a catalyst precursor salt. In one embodiment, a metal oxide precursor salt is dissolved in an aqueous solution including an alcohol, and the solution is then added to the mixture. Suitable alcohols include methanol, ethanol, isopropanol, propanol, butanol, combinations including at least one of the foregoing alcohols, and the like. In a preferred embodiment, the metal oxide precursor salt is dissolved in isopropanol and deionized water solution. The amount of alcohol used in the solution is dependent on the solubility of the metal oxide precursor salt, wherein the volume fraction of alcohol in an aqueous solution is about 30 to about 90% (v/v), with about 40 to about 80% (v/v) preferred and with about 50 to about 60% (v/v) more preferred.

Depending on the desired properties, a solution of the metal oxide precursor salt may contain further additives, for example, ions that increase the solubility of the metal oxide precursor. Suitable ions include hydroxides, chlorides, phosphates, sulfates, ammonium, potassium, sodium, lithium, or the like. Preferably, the additive is ammonium hydroxide. The weight fraction of additive in the solution is about 0.1 to about 10% (w/v), with about 0.5 to about 5% (w/v) preferred and with about 1% (w/v) more preferred.

The spheroids are then dried at a temperature of about 40° C. to about 200° C. and typically screened. The ceramic spheroids are then over-fired in a kiln, which allows for the formation of internal air cells, making the finished product less dense. The firing atmosphere is typically air. The silicon carbide in the spheroids is oxidized during firing, the SiC near the surface being more extensively oxidized than that in the core.

The product from the kiln is screened using standard methods known to those skilled in the art. Before, during or after the screening step, the fired spheroids may be subjected to vigorous agitation by air or some other agitation means or to a water-washing step in order to remove dust from their surfaces.

The catalyst precursor may be added to the mineral particulates or to the parting agent. The quantity of catalytic metal present in the ceramic media is dependent on the nature of the ceramic. The quantity of catalytic metal is 0.01 to 5.00% by weight, more preferably 0.15 to 2.80% by weight, and most preferably 0.30 to 0.60% by weight.

In another embodiment, an aggregate-containing product bonded by an aluminosilicate hydrogel is made by a two-part mixing and blending of binder components with various granular-like aggregates, modifiers and/or fillers. The resulting compositions are temporarily fluid and formable for short, controllable periods of time but which thereafter become a strong, rigid, adherent, erosion resistant composite requiring little or no external heat supply to achieve full set. Once set, the composite is baked at a temperature in excess of 500° C. to provide ceramic product. In other embodiments, the composite is baked at greater than 600° C. and in yet other embodiments, is baked at greater than 750° C. To form a porous network, a blowing agent may be introduced. For example, gas may be injected into the mixture prior to setting up as a composite, which is then backed at the higher temperature. In another embodiment, a reactive gas generating substance may be added to the dispersion, the substance being selected to react with acid or alkali present with the dispersion to produce the required gas in situ, either when included or when subjected to agitation or heating. In yet another embodiment, the mixture can be subjected to high intensity agitation while exposed to the atmosphere. Foaming stabilizers (e.g., surfactants) can be added to stabilize the foam.

In this embodiment, the process generally includes mixing a binder, granular-like aggregates, and the catalyst precursor in a suitable mixer, which is then thermally activated to form ceramic catalyst material. For example, the binder may comprise 35-38% by weight percent alkali, 27-32% by weight percent alumina, and 27-32% by weight percent silica, where the range of mole ratios of alumina to silica of about 0.07 to 4.20. This binder is combined with various types and/or combinations of particulate aggregate materials, presently the most commonly used of which from a cost effective standpoint is silica sand, usually in mixtures of coarse and fine grades to achieve optimum compaction densities.

Other suitable granular like aggregates include, but are not limited to, zircon, mullite, fused silica, kyanite, alumina, chromite, rutile, ilmenite, sillimanite, forsterite, olivine, talc, refractory clays, beryl, feldspar, perlite, vermiculite, and the like.

The ratio of binder to aggregate varies with the intended application but this binder is always present in amounts greater than 10% and generally about 30% by weight of the total composition. The solids content of the binder itself is about 10 to 50% by weight of its solution when added to the aggregate, depending more particularly on strength requirements.

The catalytic metal salt of oxide can be added to the binder or aggregate mixtures. The quantity of catalytic metal present in the ceramic media is dependent on the nature of the ceramic. The quantity of catalytic metal is 0.01 to 5.00% by weight, more preferably 0.15 to 2.80% by weight, and most preferably 0.30 to 0.60% by weight.

Several types of mixing equipment may be used to form the unfired ceramic catalyst material such as balling pans, disk spheroidizing machines, high energy mixer, and the like. Two examples of such machines are the Littleford mixer and the machine known as the Eirich machine. The Eirich machine is described in U.S. Pat. No. 3,690,622.

The product after heat treatment can be used as is or can be screened if in the form of spheroids using standard methods known to those skilled in the art.

As previously discussed, the ceramic catalyst material is well suited for processes for point of use generation of aqueous chlorine dioxide. The aqueous chlorine dioxide solution can be produced by mixing a water-soluble alkali metal chlorite solution with an inorganic acid, organic acid, oxidizer, or a mixture thereof to form chlorous acid and then contacting the mixture with the ceramic catalyst material, such as the one described herein.

The aqueous chlorine dioxide solution can also be produced by decomposition of chlorous acid using the catalyst material. A decationization system is first used to convert alkali metal chlorite to chlorous acid, which is then catalytically converted to chlorine dioxide by contact with the ceramic catalyst material, such as the one described herein. The decationization system can consist of a regenerable or nonregenerable cation exchange column or an electrochemical acidification cell.

A water-soluble chlorite solution or water-soluble chlorite solid (crystal, flake, granular, etc.) having a concentration from about 5 to about 350 grams per liter is prepared in an appropriate vessel or container. The water-soluble chlorite consists of a metal chlorite, such as sodium, potassium, or lithium chlorite. Preferred metal chlorites are alkali chlorites such as sodium or potassium chlorite. While any chlorine dioxide liberating compound may be used, water-soluble chlorites are preferred because they are readily available and inexpensive.

An inorganic or organic acid with an acid dissociation constant, expressed in the form of pKa, of less than 4.0 is added to the solution in sufficient amount to adjust the pH from about 2.0 to 3.0. Examples of such acids include, but not limited to, hydrochloric, sulfuric, phosphoric, amidosulfonic, bromoacetic, chloroacetic, citric, maleic, malic, oxalic, sodium acid sulfate, succinic acids, or a mixture thereof. The preferred acids include the food grade acids, such as citric, phosphoric, hydrochloric, malic, or a mixture thereof.

An oxidizer that readily gives off oxygen or other oxidizing substances, such as ozone or chlorine, is added to the solution in an amount that corresponds to the concentration of the water-soluble chlorite and stoichiometry of the desired chlorine dioxide reaction. Examples of such oxidizers include, but not limited to, sodium hypochlorite, chlorine gas, sodium perborate, strontium peroxide, sodium peroxydisulfate, potassium peroxydisulfate, sodium peroxide, trichloroisocyanuric acid, calcium hypochlorite, 1,3-dichloro-5,5-dimethylhydantoin, 1,3-dibromo-5,5-dimethylhydantoin, 1-chloro,3-bromo-5,5-dimethylhydantoin, sodium dichloroisocyanurate, or a mixture thereof.

The solution mixture is contacted with a catalyst, such as the one described herein, to assure the desired conversion of water-soluble chlorite solution to chlorine dioxide. The contact time is dependent on the temperature of the solution, where contact time decreases with increasing solution temperature. The types of acid and oxidizer used will determine the type of catalytic metal required. Examples of such catalytic metals include, but are not limited to, the metals, oxides, and salts of the transition-metal (elements found between the Group IIA Elements and the Group IIB Elements in the Periodic Table of the Elements), valve-metal (selected from the group consisting of titanium, tantalum, niobium, and alloys thereof), and precious-metal (selected from the group consisting of gold, palladium, platinum, rhodium, iridium, and ruthenium) groups, or a mixture thereof.

As used herein, the terms "first," "second," and the like do not denote any order or importance, but rather are used to distinguish one element from another, and the terms "the," "a," and "an" do not denote a limitation of quantity, but rather denote the presence of at least one of the referenced item. Furthermore, all ranges disclosed herein are inclusive of the endpoints and independently combinable.

While the disclosure has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the disclosure without departing from the essential scope thereof, such as for producing other halogen oxides. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A process for making a porous ceramic catalyst material consisting of: (i) mixing a catalyst precursor material with a mineral particulate, a binder, silicon carbide, and a parting agent to form unfired spheroids; and (ii) heating the unfired spheroids at a temperature effective to oxidize the silicon carbide and the catalyst precursor material to form the porous ceramic catalyst material.

2. The process of claim 1, wherein the binder is selected from a group consisting of bentonite starch, polyvinyl alcohol, cellulose gum, polyvinyl acetate, sodium lignosulphonate, and mixtures thereof.

3. The process of claim 1, wherein the parting agent is selected from the following group: magnesium oxide, zircon, diaspore high alumina clays, surface metal oxides, and mixtures thereof.

4. The process of claim 1, wherein the mineral particulate is a silicate.

5. The process of claim 1, wherein the mineral particulate is selected from the following group: orthoclase, nepheline, hornblende, diopside, titanite, apatite, biotite, kaolinite, analcite, plagioclase, pyroxene, magnetite, quartz, perlite, apatite, biotite, pyrite, vermiculite, and mixtures thereof.

6. The process of claim 1, wherein the catalyst precursor is a metal oxide salt.

7. The process of claim 6, further comprising adding an aqueous solution containing ions selected from the following group: hydroxides, chlorides, phosphates, sulfates, ammonium, sodium, lithium, and mixtures thereof.

8. The process of claim 1, wherein the catalyst precursor is an oxide of a metal selected from the following group: ruthenium, platinum, palladium, osmium, iridium, rhodium, titanium, lead, zirconium, niobium, manganese, tantalum, tungsten, tin, and mixtures thereof.

9. The process of claim 1, wherein the catalyst metal is 0.01 to 5.00% by weight of the mixture.

10. A process for forming a porous ceramic catalyst material, the process consisting of: (i) mixing a binder, aggregates, and a catalyst precursor, wherein the binder comprises an alkali, alumina, and silica; (ii) forming a rigid composite of the mixture; and (iii) heating the rigid composite to a temperature greater than 500° C. to form the porous ceramic catalyst material.

11. The process of claim 10, wherein the aggregates comprise zircon, mullite, fused silica, kyanite, alumina, chromite, rutile, ilmenite, forsterite, olivine, talc, refractory clays, beryl, feldspar, perlite, vermiculite, and mixtures thereof.

12. The process of claim 10, wherein the binder is greater than 10% by weight of the composite.

13. The process of claim 10, wherein alumina and silica are at a mole ratio of 0.7 to 4.20, respectively.

14. The process of claim 10, wherein the catalyst precursor is an oxide of a metal.

15. The process of claim 10, wherein forming the composite comprises dispersing air into the mixture to form a foamed mixture.

16. The process of claim 10, wherein forming the composite comprises dispersing a blowing agent into the mixture, wherein heating the mixture generates gas to form the porous ceramic catalyst material.

* * * * *

UNITED STATES PATENT AND TRADEMARK OFFICE
CERTIFICATE OF CORRECTION

| | | |
|---|---|---|
| PATENT NO. | : 8,551,904 B2 | Page 1 of 1 |
| APPLICATION NO. | : 13/049412 | |
| DATED | : October 8, 2013 | |
| INVENTOR(S) | : DiMascio | |

It is certified that error appears in the above-identified patent and that said Letters Patent is hereby corrected as shown below:

In the claims,

Claim 11 - Column 9, line 3, the word "sillimanite" is missing between ilmenite and forsterite. The line 3 should read "rutile, ilmenite, sillimanite, forsterite"...

Signed and Sealed this

Eighth Day of December, 2015

Michelle K. Lee
*Director of the United States Patent and Trademark Office*